Figure 1:
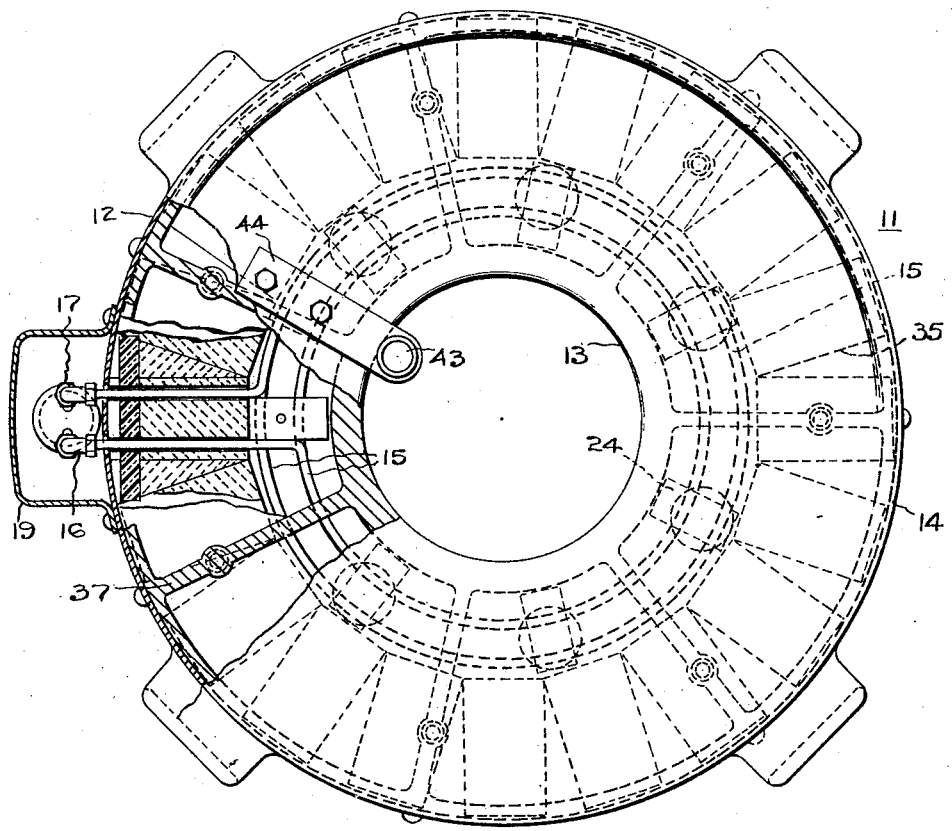

April 2, 1929.  A. D. KEENE  1,707,308
ELECTRIC HEATER UNIT
Filed June 24, 1924  2 Sheets-Sheet 1

WITNESSES:

INVENTOR
Alvin D. Keene
BY
ATTORNEY

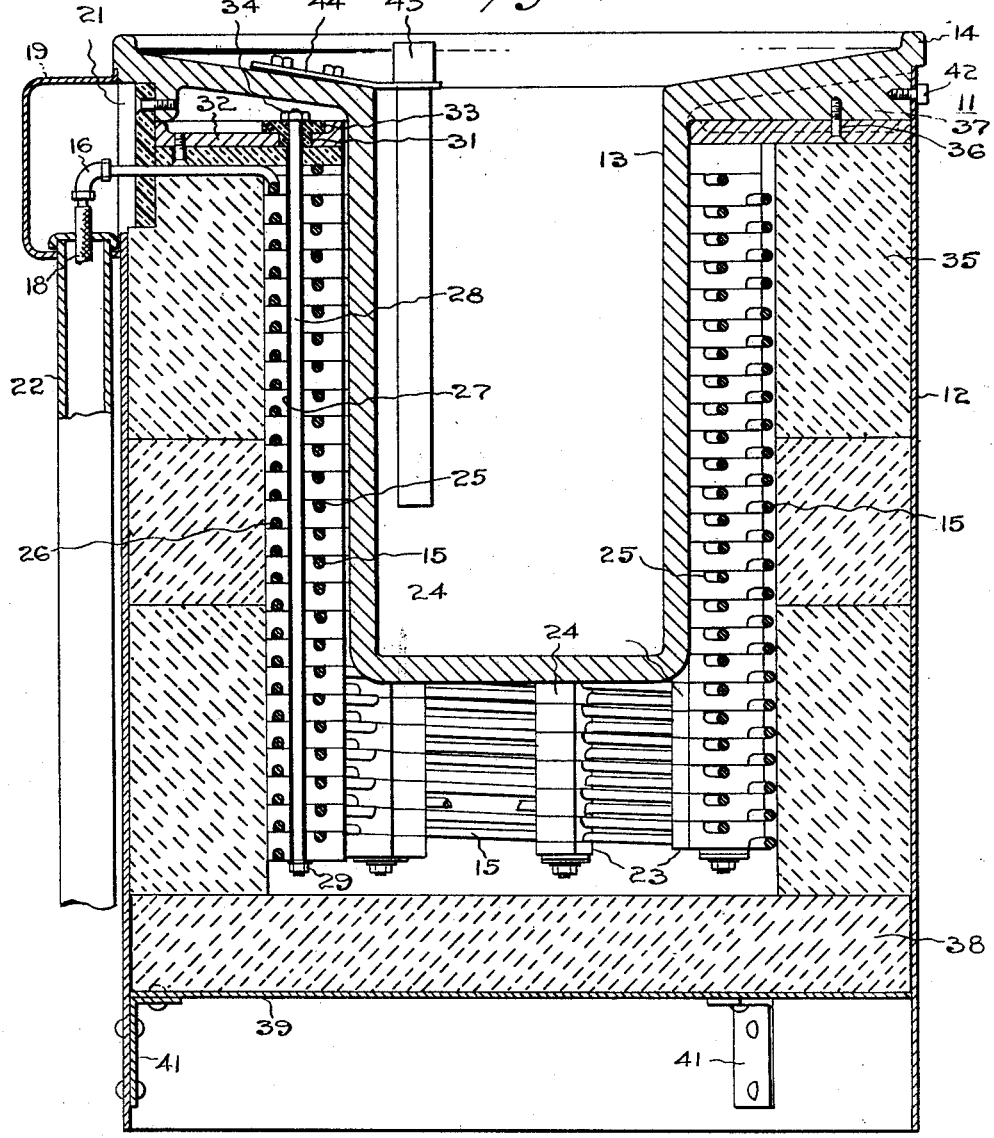

Patented Apr. 2, 1929.

1,707,308

UNITED STATES PATENT OFFICE.

ALVIN D. KEENE, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRIC HEATER UNIT.

Application filed June 24, 1924. Serial No. 722,035.

My invention relates to electrically heated appliances and particularly to electric heating units therefor.

The object of my invention is to provide a relatively simple, compact and high capacity, removable heating unit for an electrically heated solder or babbitt pot.

In practicing my invention, I provide a relatively heavy resistor wire that is preformed into a double layer open helical coil. A plurality of sets of bars of refractory electric-insulating material, each having a lateral groove in two opposing faces thereof for receiving the resistor wire, hold the turns in proper operative positions relatively to each other and to the solder pot. A bolt extends through all of the bars of each set and serves also to support the heating unit from an annular supporting member.

Figure 3:
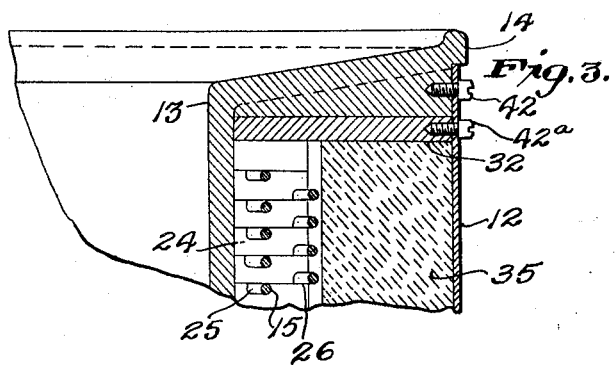

In the drawings,

Figure 1 is a top plan view of a device embodying my invention, a portion being cut away to show the internal construction, Fig. 2 is a view in vertical section therethrough, and Fig. 3 is a fragmentary sectional view of a modified form of device embodying my invention.

An electrically heated solder pot, designated generally by the numeral 11, comprises an outer substantially cylindrical casing 12 that may be made of sheet metal. A metal pot 13 is located within the casing 12 and has an upper outwardly extending flange 14 integral therewith. The rim, or outer portion of the flange, is located above the inner portion thereof in order that any solder or babbitt that is spilled thereon may flow back into the pot itself.

A relatively large annular space is provided between the outside of the solder pot proper and the inside of the casing 12. A heating unit is located adjacent to the outer surface of the solder pot and comprises a resistor member 15, of relatively heavy wire, that is preformed to comprise a double-layer open helical coil, substantially as illustrated in the figures of the drawing.

The axial length of the coil is greater than the depth of the solder pot, so that the lower turns thereof are located well below the bottom surface of the pot itself. Any suitable or desired method of constructing the double-layer helical coil may be employed. I prefer to wind each layer on a separate form, or to form the same by any suitable means, and then to connect the lower ends thereof together, in any manner usual in such devices. The upper ends thereof extend substantially at right angles to the turns, that is, they extend radially outwardly from the respective coils, as is more particularly shown in Fig. 1 of the drawings.

The upper ends of the heating element extend a short distance beyond the casing 12 and are there provided with suitable connectors 16 and 17 to which the ends of suitable supply circuit conductors 18, only one of which is shown in Fig. 2 of the drawings, may be connected.

A terminal box 19 is suitably secured against the casing 12 at the point where the upper ends of the resistor member extend through an opening 21 in the casing. A conduit member 22 extends into the bottom of the terminal box 19 in order to protect the supply circuit conductors.

A plurality of sets 23, of bars 24 of refractory electric-insulating material, are provided, each bar having a pair of spaced grooves 25 and 26, extending laterally across the respective flat faces thereof, substantially as illustrated in Fig. 2 of the drawings. The respective turns of the inner helices are located in the inner arcuate grooves 25, while the turns of the outer helices are located in the respective outer arcuate grooves 26. Each of the bars of refractory material is provided with an opening extending laterally therethrough and numbered 27 in Fig. 2 of the drawings, through which a long rod 28 extends. The rod 28 is provided, at the bottom thereof, with a nut 29 having screw threaded engagement therewith.

At the upper end, the rod 28 extends beyond the assembled set of bars 24 and through a suitable opening 31 in a supporting member 32 that is constituted by a substantially annular metal member fitting loosely around the body of the solder pot immediately below the flange portion 14 thereof. A refractory washer 33 is located in the opening 31 and the rod 28 extends therethrough in order to insure that it shall be electrically insulated from the metal supporting plate 32. A second nut 34 is provided at the upper end of the rod 28 whereby the bars of refractory insulating material may be suitably clamped together. Any suitable or desired number of sets of refractory bars and of securing rods may be employed spaced substantially equidistantly around the resistor member.

A plurality of blocks 35, of a suitable heat insulating material are located between the outer layer of the helically wound resistor member and the inside of the casing. I have illustrated these blocks 35 as being substantially rectangular in contour in order to permit of the use of a relatively simple form of block, that may be purchased in the open market. If desired, or if necessary, special blocks of wedge shape, may be employed which will fill all of the space between the outer casing 12 and the helically wound resistor member.

The annular supporting member or plate 32 is bolted against the flange 14 by a plurality of relatively heavy machine screws 36, that operatively engage a stiffening web 37, a plurality of such webs being provided, and a corresponding plurality of machine screws 36 being employed to suitably clamp the supporting plate against the flange of the solder pot.

If desired, a block 38, of heat-insulating material and of substantially circular contour, is located adjacent to the bottom of the casing 12 and is supported therein by a suitable bottom plate 39, which, in turn, may be supported by a plurality of spaced lugs 41, riveted to the casing at the bottom portion thereof. The upper end of the casing 12 may be secured to the flange 14 by suitable machine bolts 42 that operatively engage the outer end of the respective stiffening wedges 37.

If desired, the supporting plate 32 may be supported by machine screws 42a projecting through the casing 12 and into the outer peripheral portion of the member 32 in a manner substantially similar to the machine screws 42. Whereas, with the hereinbefore described construction as illustrated in Fig. 2 of the drawings, the heating element is removable from the casing with the pot, the latter construction above mentioned and shown in Fig. 3 would permit of removing the pot while leaving the heating unit in its proper operative position within the casing and particularly within the heat-insulating means hereinbefore described.

As it is highly desirable in devices of this kind to be able to regulate the temperature, I provide a projecting tube 43 for receiving a suitable thermostat or thermometer, which tube extends into the pot and is supported therein by a suitable supporting member 44, that is bolted against the upper beveled surface of the flange portion 14.

The device embodying my invention thus provides a relatively simple and high-capacity heating unit comprising a preformed resistor member in the shape of a double layer open helical coil, the turns of which are prevented from both lateral and longitudinal movements relatively to each other by grooved refractory bars that are mounted on an elongated rod which, in turn, is employed to support the entire heating unit from a supporting plate. The refractory bars hereinbefore mentioned are also effective to maintain the coiled resistor member in proper operative position relatively to the outer surface of the babbitt or solder pot. By employing two substantially similar coils and connecting them at the bottom ends, I obtain a substantially non-inductive resistor coil.

Various modifications and changes may be made without departing from the spirit and scope of the invention, and I desire, therefore, that only such limitations shall be placed thereon as are imposed by the prior art.

I claim as my invention:

In a heating unit for an electrically heated appliance, in combination, a resistor member preformed into a double-layer open helical coil, a plurality of sets of laterally-grooved refractory members for holding said coil in proper operative position around an appliance and for preventing both lateral and longitudinal movements of the turns of said coil, a single means extending through all of the refractory members of a set for holding them in proper operative positions relatively to each other and for supporting said coil and refractory members from an appliance.

In testimony whereof, I have hereunto subscribed my name this 16th day of June, 1924.

ALVIN D. KEENE.